Patented May 19, 1936

2,041,217

UNITED STATES PATENT OFFICE 2,041,217

PLASTIC COMPOSITION

Vernon L. Smithers, Akron, Ohio, and Herbert A. Winkelmann, Chicago, Ill.

No Drawing. Application May 23, 1935, Serial No. 23,024

5 Claims. (Cl. 106—23)

The present inventors have been seeking to improve upon plastic compositions for various purposes, and particularly to find new and useful pigments or fillers which give improved results over the known fillers now upon the market. Heretofore, the inventors have experimented with a new kind of flour obtained by finely grinding coconut shells, and the results obtained by those experiments were so outstanding and unusual that the research has been extended to investigation of flours made from other nut shells. The former discoveries of new and remarkable properties derived from the use of coconut shell flour were fully described and discussed in the copending application Serial No. 722,509, filed April 26, 1934. The present application covers the further investigations and discoveries which widen the scope of the invention to cover flours made from a variety of nut shells, some of which have shown startling properties and advantages, especially when compounded with rubber stocks. The present application is, therefore, a continuation of the common subject matter found in the earlier application.

The invention may be applied to many uses, but it has been employed especially in rubber compositions. It has also been adapted for use in other plastic compositions, such, for example, as the usual phenol condensation products, artificial or plastic resins or the like.

The invention was designed and undertaken for the purpose of finding a new and better substitute for wood flour which is used as a common ingredient in plastic compositions and particularly in rubber compounding, condensation products and artificial resins. The objects to be obtained were to find a substitute for the wood flour which could be secured cheaply and from common or waste materials and which, if possible, would have even improved technical advantages over the wood flour. Our investigations and experiments have far exceeded what might reasonably have been suspected and have shown that flours made from nut shells have very remarkable and unexpected characteristics which make them highly valuable for the purpose.

The new material which is used is secured by grinding the shells of various nuts to a very high degree of fineness. This is admixed with the other ingredients of the plastic composition in the usual way as is well known and understood by the workers in the art. In the case of rubber, the flour is added to the rubber while it is on the mill.

The present invention is not to be confused with the use of the fibrous growth on coconut shells or husks known as "coir," or with the use of other fibrous substances, as the material which we propose to use is not fibrous, but is a flour, usually ground to an impalpable powder.

The results which have flowed from the present discoveries are not such as may be expected, nor are they obvious or to be deduced from any of the known properties of the materials employed. The present application is directed to the use of shell flours of many varieties of nuts and the investigations connected with the perfection of the invention have shown the adaptability of nut flours generally. In the former application, the advantages of coconut-shell flour have been stressed. The present application refers to the use of flours made from nut shells and more particularly to varieties of nut shells which have shown remarkable and unusual properties.

For the purposes herein recited, we have made extensive experiments with flour made from coconut shells, as described in the former application, and from walnut (English) shells, pecan shells and peanut shells as the available sources of the material.

The flour is added to the plastic matter as described, and in the case of rubber the usual vulcanizing agents, softeners, pigments and the like are added and the articles vulcanized. In the case of other plastic compositions, the articles are indurated or heat treated.

One of the most striking of the new results secured by the use of nut-shell flours is in the reduction in curing time. For the purposes of determining these facts, we have made comparisons with standard formulæ in which wood flour is commonly used. For Formula #1, 50 parts of the flour are used with 100 parts of rubber and with the same vulcanizing and other ingredients. For Formula #2, 100 parts of the flour were used with 100 parts of rubber. The time required under identical conditions to reach the optimum cure is shown in the following schedule:

|  | Formula #1 | Formula #2 |
|---|---|---|
|  | Minutes | Minutes |
| Wood flour | 90 | 90 |
| Walnut shell flour | 30 | 30 |
| Pecan shell flour | 30 | 60 |
| Peanut shell flour | 15 | 15 |

The reduction in curing time was as shown, most marked with peanut shell flour, although the reduction with walnut and pecan shell flours was also quite remarkable.

A further unusual result was that observed in making tests on tensile strength and elongation. With the same formulæ, the tests showed as follows:

*Formula #1—50 parts flour—100 parts rubber*

|  | Max. tensile | Elong. |
|---|---|---|
|  | Lbs. per sq. in. | Per-cent |
| Wood flour | 910 | 453 |
| Walnut shell flour | 1743 | 600 |
| Pecan shell flour | 1985 | 575 |
| Peanut shell flour | 1637 | 503 |

*Formula #2—100 parts flour—100 parts rubber*

| | | |
|---|---|---|
| Wood flour | 633 | 160 |
| Walnut shell flour | 883 | 500 |
| Pecan shell flour | 1040 | 475 |
| Peanut shell flour | 820 | 350 |

In addition, the resistance to abrasion was highly improved as is shown by the following results of actual tests:

|  | Formula #1 | Formula #2 |
|---|---|---|
| Wood flour | 1036 | 1480 |
| Walnut shell flour | 1118 | 1150 |
| Pecan shell flour | 852 | 766 |
| Peanut shell flour | 790 | 752 |

The slightly increased loss by abrasion in Formula #1 with the walnut shells is not explainable, but with a higher percentage of the walnut-shell flour the abrasion resistance was considerably improved.

The hardness of the stock at the optimum cure was greatly improved as shown by the following tests:

|  | Formula #1 | Formula #2 |
|---|---|---|
| Wood flour | 78 | 87 |
| Walnut shell flour | 63 | 75 |
| Pecan shell flour | 62 | 77 |
| Peanut shell flour | 71 | 85 |

In extensive aging tests performed in an oxygen bomb, it was shown that none of the stocks compounded with the nut flours aged excessively; in fact, the results were slightly in favor of the nut flours over the ordinary wood flours. The fatigue point is much higher in stocks containing the nut-shell flours and, as shown above, the stocks may be more heavily loaded with the nut-shell flours than with the usual wood flour. The rubber is more plastic on the mill while the nut-shell flour is being added and the rubber may be processed more easily.

None of the properties described above is readily deducible from the nature of the materials and the discovery of this material and the utilization of practically waste products open up a new field of manufacture and give highly beneficial results.

The proportion of the nut-shell flour which may be added to any standard rubber composition may be varied within wide range. The addition of the usual fillers, such as zinc oxide, the vulcanizing ingredient (sulphur) and the accelerators and softening agents may be left to the judgment of any ordinary skilled rubber chemist as the nut flours operate satisfactorily with any well known or standard compound and therefore they need not be particularly set forth or described.

What is claimed is:

1. In the manufacture of articles from plastics, the improvement in shortening the curing time thereof consisting in adding to such compositions in the raw state a finely ground flour made from nut shells.

2. In the manufacture of articles from vulcanized rubber or similar plastic materials, the improvement in shortening the time of vulcanization consisting in adding to the compounds of such materials a finely ground flour made from nut shells.

3. In the manufacture of articles from vulcanized rubber or similar plastic materials, the step of improving the physical qualities of the vulcanized article and shortening the time required for optimum vulcanization by compounding such materials prior to vulcanization with a finely ground flour made from nut shells.

4. In the manufacture of articles from vulcanized rubber, the step of shortening the time required for optimum vulcanization consisting in adding to the rubber compound prior to vulcanization finely ground flour made from peanut shells.

5. A composition of matter made substantially by the process of claim 3.

VERNON L. SMITHERS.
HERBERT A. WINKELMANN.